United States Patent [19]

Patterson

[11] 4,161,974
[45] Jul. 24, 1979

[54] PORTABLE BENCH FRAME FOR POWER TOOLS

[76] Inventor: Lionel Patterson, P.O. Box 117, Markham, Ontario, Canada, L3P 3J5

[21] Appl. No.: 863,861

[22] Filed: Dec. 23, 1977

[51] Int. Cl.² .............................................. B25H 1/02
[52] U.S. Cl. .................................. 144/287; 83/471.2; 83/473; 83/477; 83/483; 108/142; 144/1 R; 144/286 R
[58] Field of Search .................. 108/142, 103; 248/23, 248/349; 144/1 R, 3 R, 286 R, 286 A, 287, 288; 83/471, 471.2, 471.3, 473, 477, 483, 485, 581, 613; 125/35

[56] References Cited

U.S. PATENT DOCUMENTS

| | | | |
|---|---|---|---|
| 2,470,165 | 5/1949 | Hantzler | 248/349 |
| 2,555,217 | 5/1951 | Young | 144/286 R X |
| 3,342,226 | 9/1967 | Mancour et al. | 144/288 R |
| 3,738,214 | 6/1973 | Wilson | 144/1 R |

*Primary Examiner*—Othell M. Simpson
*Assistant Examiner*—W. D. Bray

*Attorney, Agent, or Firm*—David W. Wong

[57] ABSTRACT

A portable bench frame suitable for precision woodworking particularly in relatively large workpieces is shown. The bench frame comprises a substantially large rectangular frame supported by two pairs of foldable legs. A traverse beam is suspended above the middle longitudinal portion of the bench top. The beam is mounted to two spaced telescopic columns located at the corners of the rear edge of the bench top. The telescopic columns are adjustable to raise or lower the traverse beam with respect to the bench top. A rotatable work table top is removably mounted on the bench top and a plurality of basic woodworking tools such as a rotary saw, a lathe, a drill press may be mounted on the frame so that these tools are conveniently available for performing various woodworking operations without having to remove or re-mount tools. The tools can be arranged such that each tool does not interfere with the working of the other tools mounted on te bench frame. Auxiliary supports are provided for supporting a relatively large and/or long workpiece on the worktable top.

17 Claims, 12 Drawing Figures

PORTABLE BENCH FRAME FOR POWER TOOLS

BACKGROUND OF THE INVENTION

This invention relates to a multi-purpose bench frame designed mainly for woodworking. More particularly, it relates to a versatile and portable bench frame suitable for carrying out precision woodworking operations on relatively large articles or work pieces, safely and easily.

Common bench frames for precision woodworking, which are accessible to the financial and space limitations of small professional woodworkers or hobbyists, usually are incapable of handling large or even fairly large articles or work pieces, such as panels and/or doors which may have dimensions of 4 feet by 8 feet.

Known bench frames commonly comprise a bench having a horizontal work table top for supporting a work piece and having either one of the following two types of general structures:

(i) A selected tool is mounted beneath the work table, making accessibility difficult for tool-changing purposes. Moreover, the relatively small size of the work table and of the work guide or fence are usually inadequate to properly and safely support or guide large work pieces. Such benches do lend themselves to built-on additional support, but necessitate knowledge, effort and materials to make such additional support. Frames of this type, however, are not readily transportable and the addition of additional support makes them even less transportable.

(ii) A single cantilever beam is mounted over the middle of the table top, through a single telescopic column which is mounted to the middle of the rear edge of the table top. A selected power tool, such as the motor and carriage assembly of a radial arm saw, is slidably mounted on the cantilever beam to perform various woodworking or other operations. Like (i) above, this second type of frame does not provide adequate support or guide for the safe and accurate handling of large materials. Furthermore, it suffers from the serious disadvantage of lending itself poorly to the addition of additional support. Firstly, the telescopic column must be positioned at the centre of the rear edge of the table top, where it interferes with large or even fairly large work pieces. Secondly, the cantilever beam cannot be lengthened appreciably, because it is supported only at one end. Despite its limited size, this type of bench frame also is not readily transportable.

Industrial bench frames are capable of handling large work pieces. However, they are expensive and cannot be afforded by small professional woodworkers and/or hobbyists. Moreover, they are large and require space which small professionals and hobbyists do not have. Additionally, they are not transportable.

Known stands, cradles and benches are available for mounting different selected power tools thereon, for the performance of various woodworking operations. Normally, they allow only one power tool to be mounted thereon at a time. In order to perform different operations, one tool must be removed for a different tool to be mounted. Thus, such stands require the user to disengage, lift, carry, position and adjust what, often, are relatively heavy pieces of equipment, components or adapters. Moreover and apart from the need for additional space on the job site to accommodate such tools, components or adapters, such equipment often becomes scattered around the job site, becomes difficult to locate, and in fact presents a hazard to the user in that it obstructs the user's movement about the job site.

OBJECTS OF THE INVENTION

The primary object of the present invention is to provide a portable bench frame usable for performing precision woodworking operations on large work pieces.

Another object of the present invention is to provide a bench frame which permits a number of often used power tools to be mounted thereon, such that they are readily available for use without one tool interfering with the other tools.

It is a further object of the present invention to provide a bench frame which is easily transportable and is relatively economical to produce, such that it can be available for use by small professional woodworkers and individual hobbyists.

SUMMARY OF THE INVENTION

The invention is directed broadly to a bench frame comprising a bench having a substantially large rectangular frame body, two pairs of foldable legs provided at two ends of said frame body and operative to support said frame body in a horizontal manner, two spaced telescopic columns provided at two corners of one longitudinal edge portion of said frame body, said columns having two cantilever members provided thereon extending forwardly in a spaced manner above said frame body, an elongated traverse beam mounted to said cantilever members, said traverse beam being operative to receive selected tools to be slidably mounted thereon, and said columns being adjustable simultaneously for selectively raising or lowering said traverse beam with respect to said frame body.

BRIEF DESCRIPTION OF THE DRAWINGS

Other objects and a better understanding of the present invention will become more apparent from the following description, taken in conjunction with the accompanying drawings, in which.

DETAILED DESCRIPTION OF A SPECIFIC EMBODIMENT BY WAY OF EXAMPLE

Figure 1:
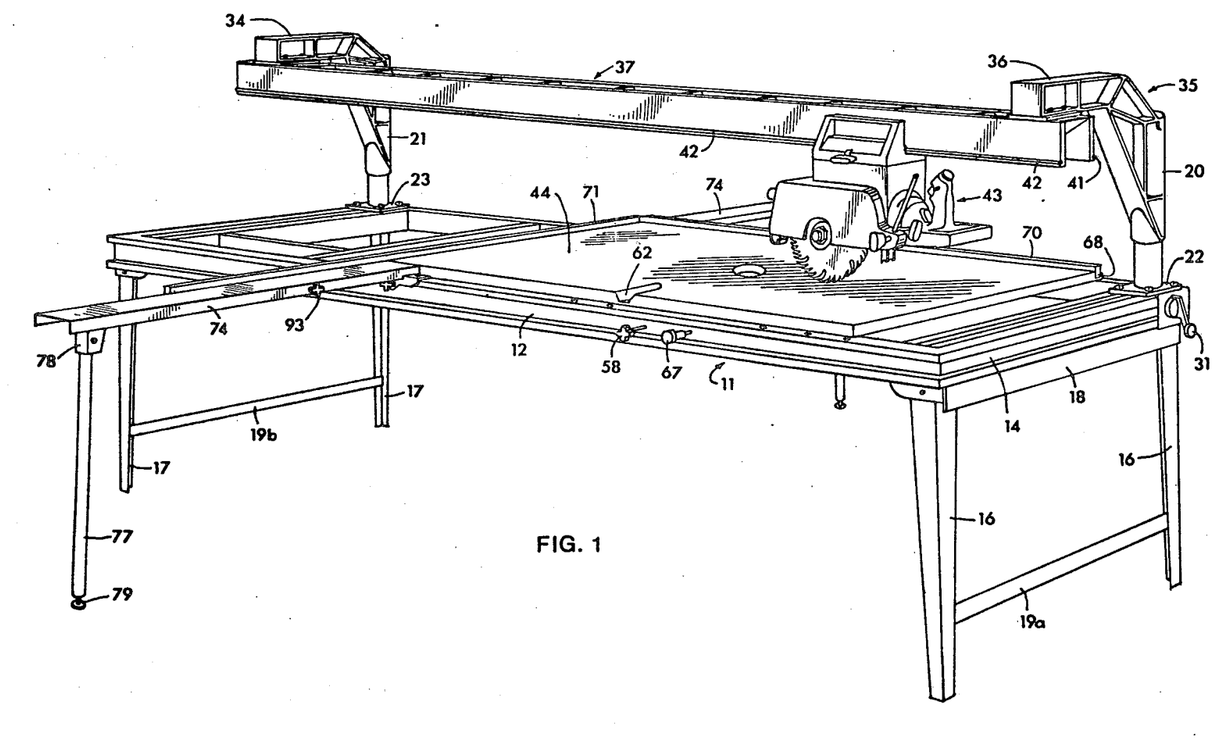
FIG. 1 is a perspective view of the bench frame according to the present invention with the motor and carriage assembly of a radial arm saw, a rotatable work top and auxilliary extension outriggers mounted thereon.
Figure 2:
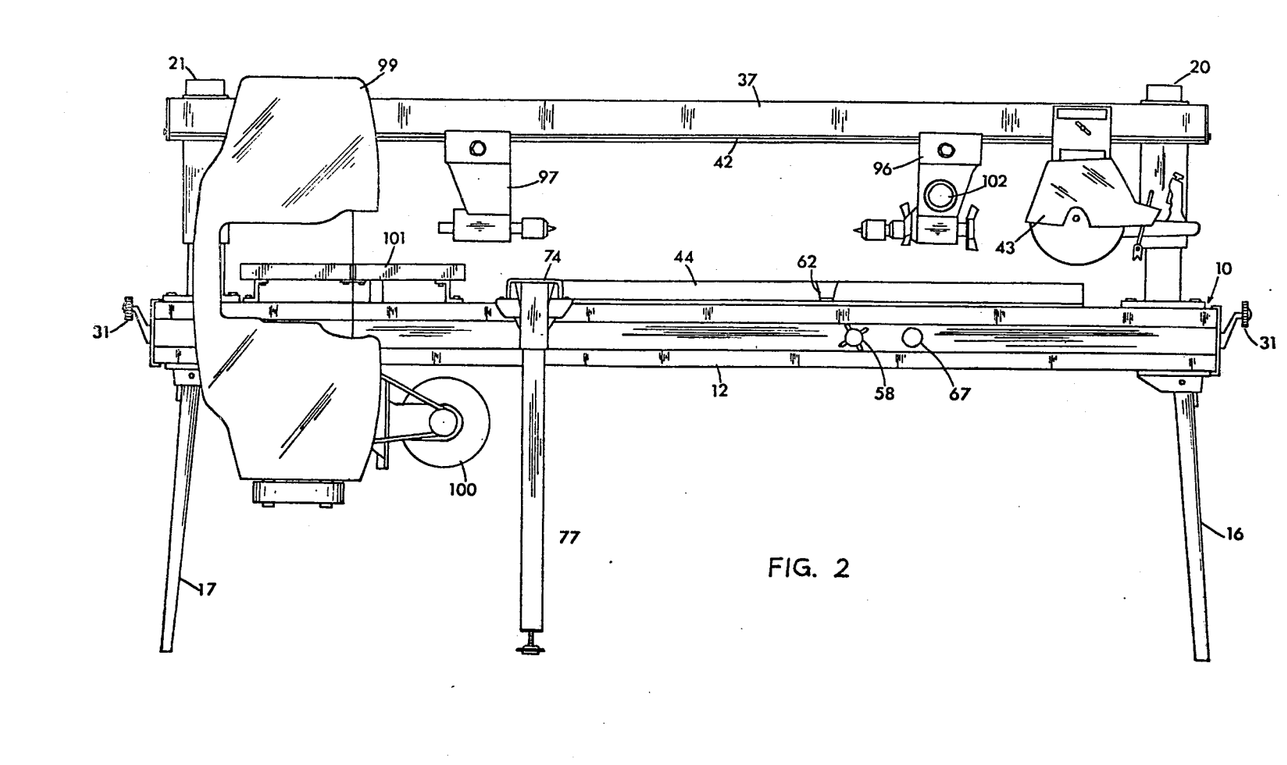
FIG. 2 is an elevation side view of the bench frame showing the motor and carriage assembly of a radial arm saw, a lathe tailstock and headstock and a band saw mounted thereon.

Referring to the drawing wherein similar characters of reference represent corresponding parts in each of the several views, the bench frame is generally indicated by the reference numeral 10. The bench frame 10 has a rectangular frame body 11 constructed by four steel C-sections 12, 13, 14 and 15. The C-sections all have an open side facing outwards. The frame body 11 is supported by two pairs of foldable legs 16 and 17. The legs 16 and 17 are pivotally mounted to the four corners of the frame body 11 such that they are selectively foldable either in a folded condition to lie underneath the frame body or in an upright condition to support the frame body in a horizontal position as shown in FIGS. 1 and 2. An abutment member 18 is provided on the end sections 14 and 15 for maintaining the legs in their upright position, and the two pairs of legs 16 and 17 may be reinforced by cross members 19a and 19b.

Figure 4:
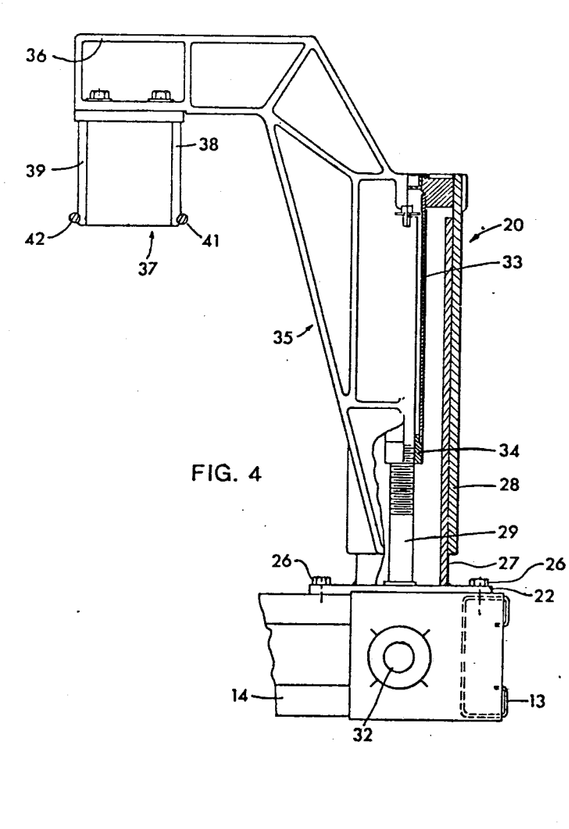
FIG. 4 is an enlarged partial sectional side elevation view of the telescopic column of the bench frame.

Two telescopic columns 20 and 21 are provided at the two rear corners of the frame body 11. The columns 20 and 21 have two bases 22 and 23 which are secured to the end sections 14 and 15 and two transverse braces 24 and 25 by mounting means such as bolts 26. Each column 20 or 21 comprises an inner tubular member 27 and an outer tubular member 28 slidably mounted over the inner tubular member. In the embodiment shown herein by example, the outer tubular member is slidably movable with respect to the inner tubular member by the provision of a vertical worm shaft 29 mounted on the base and rotatable by gear means 30 by turning a handle 31. The handle 31 is mounted on an elongated linkage rod 32 which extends from one end of the frame body to the other end. The gear means 30 of both columns 20 and 21 are coupled to the linkage rod 32 such that the rotation of handle 31 will move the outer tubular members of the two columns simultaneously with respect to the respective fixed inner tubular members. A handle 31 is provided at each end of the linkage rod such that both columns may be conveniently operated by turning either one of the handles. The top end of the outer tubular member 28 is connected to the top end of a slider tube 33 which carries a threaded element 34 at its lower end. The threaded element 34 engages with the worm shaft 29 so that the rotation of the worm shaft 29 will cause the slider tube as well as the outer tubular member to move telescopically with respect to the fixed inner tubular member. It will be appreciated that other telescopic means operated by pneumatic or electrical means may be used for the same purpose as the manual means shown herein by way of example.

The outer tubular member 28 of the telescopic columns 20 and 21 has an inverted L-shaped girder 35 integrally formed thereon. The girder 35 has a horizontal portion 36 extending forwardly towards the front of the frame body and locating in a spaced manner above the center of the transverse width of the frame body. An elongated traverse beam 37 is mounted to the underside of the horizontal portion 36 of both girders 35 and is located preferably immediate the free end of the horizontal portions 36, such that the traverse beam 37 is located in a spaced manner above the transverse middle portion of the frame body.

Figure 5:
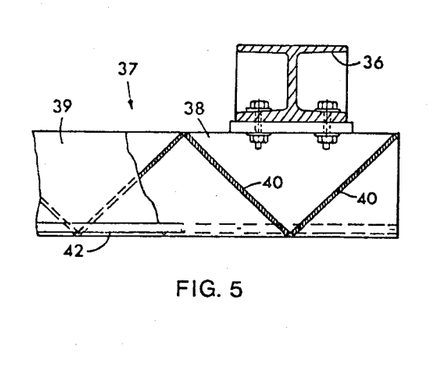
FIG. 5 is an enlarged partial sectional side elevation view of the traverse beam and the end view of the cantilever girder.

The traverse beam 37 may comprise either a rectangular beam or two elongated plates 38 and 39 joined together by a plurality of cross bracing plates 40 as best shown in FIG. 5. Two runner rods 41 and 42 are mounted at the lower longitudinal edge portions of the traverse beam so that various selected woodworking power tools may be slidably mounted on the traverse beam. The traverse beam is designed to engage with the mounting means of conventional power tools through an adapter carriage if necessary, which can slidably engage with the runner rods. As shown in FIG. 1, the motor and carriage assembly 43 of a radial arm saw or circular saw is mounted on the traverse beam. The saw assembly 43 may be of any known structure which can be releasably locked at any selected location along the beam and it can be set at any selected orientation with respect to its vertical axis.

A rectangular rotatable work table 44 is detachably mounted on the frame body and it is of a size such that it can rest on the front and rear C-sections of the frame body 11. It comprises a rectangular upper top panel 45 and a lower panel 46 coterminously secured together. A central opening 47 is formed at the centre of the work table. The lower panel 46 is mounted by bolts to an annular plate 48 which has a central opening concentric with that of the central opening 47 of the work table. A tubular shaft 49 is secured to the annular plate 48 such as by welding, such that the tubular shaft 49 extends perpendicularly downward from the annular plate 48 to engage rotatably with a bearing 50. It will be understood that the annular plate may be in the form of an integral flange formed at the upper end of the tubular shaft. The bearing 50 is fixedly secured between the upper extended flange 51 of two transverse brace members 52 and a mounting plate 53 is fixedly secured to the lower flange of the transverse brace members 52 by bolts 54. Thus, the work table 44 is rotatable about the tubular shaft 49 with respect to the frame body 11. The tubular shaft 49 provides a chute for conveniently discharging the waste from such operations as drum sanding from the work table therethrough to a catch bin or to the floor, and accommodates certain tools in operation, such as shaper cutter, router bit, drum sander, etc.

Figure 3:
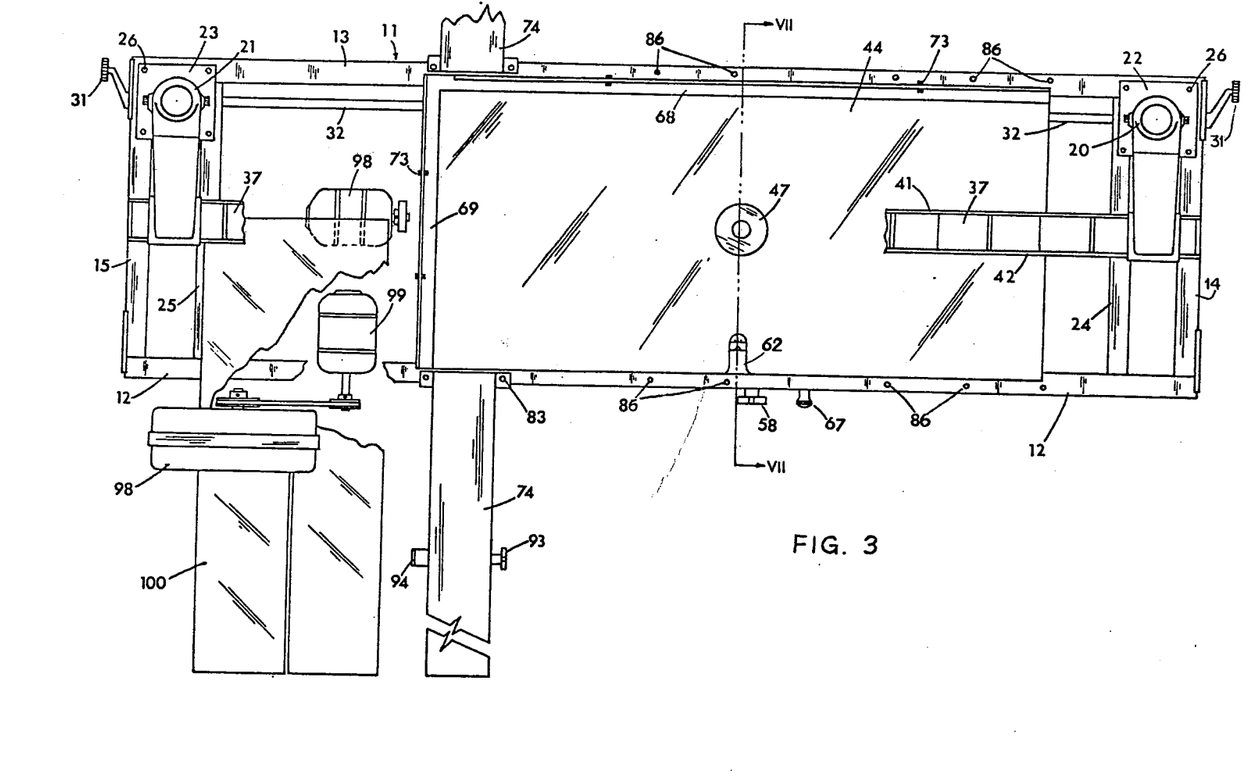
FIG. 3 is a top elevation view of the bench frame.

A clamping means is provided at the lower end of the tubular shaft 49 for retaining the work table in any selected orientation with respect to the frame body 11. The clamping means comprises a split-end collar gripping block 55 secured to the lower plate 53. The gripping block is operated by the cooperation between a nut 56 and a threaded end portion of a rotatable rod 57 which extends outwards through the front C-section 12 and has a knob 58 provided thereon. The degree of orientation of the work table is indicated by a pointer 59 mounted on a spacer plate 60 which is secured under the edge portion of the front edge of the lower panel 46. The spacer plate 60 has the same thickness as the annular plate 48 such that the work table 44 can rest stably also on the front C-section 12 of the frame body as well as on the transverse brace members 52. An arcuate graduated scale 61 is mounted on the transverse brace members 52. The pointer 59 and the graduated scale 61 are visible through a slot opening 62 provided in the front edge portion of the work table 44 as best shown in FIGS. 1 and 3.

Figure 8:
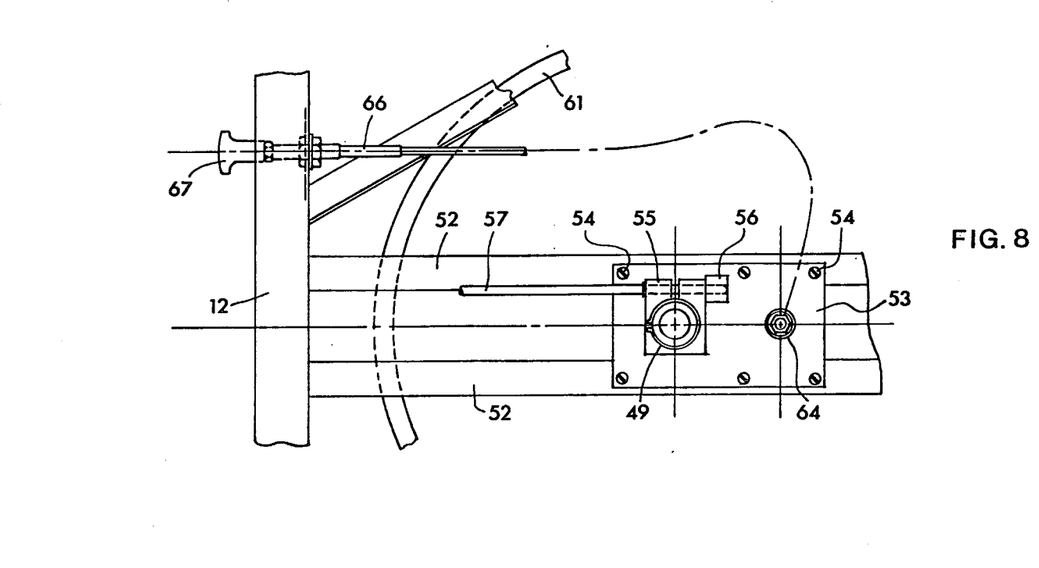
FIG. 8 is an enlarged isolated bottom view of the locking means for the rotatable work top and sectional rotation means.
Figure 9:
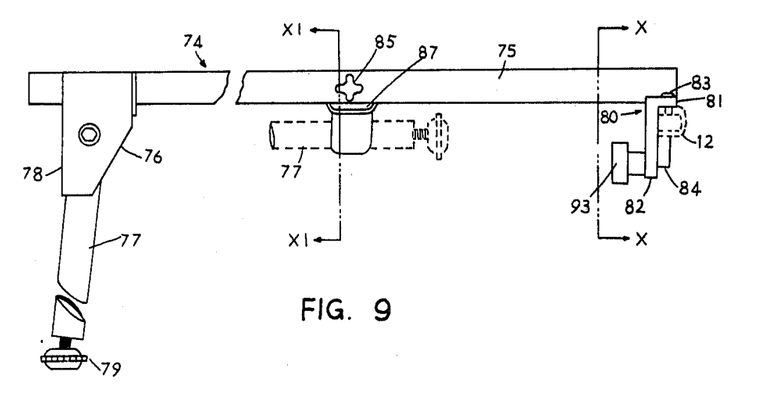
FIG. 9 is a side elevation view of the outrigger.
Figure 10:
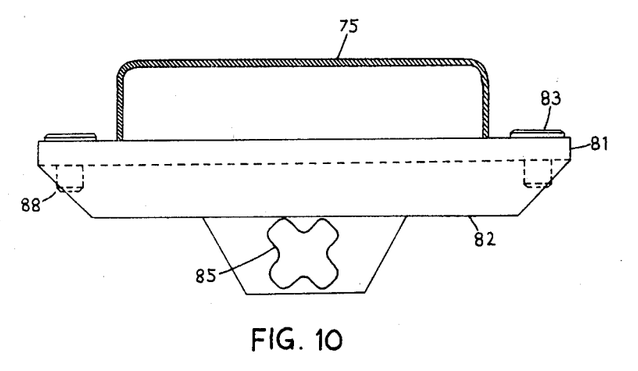
FIG. 10 is an enlarged partial sectional view taken along line X—X of FIG. 9.
Figure 11:
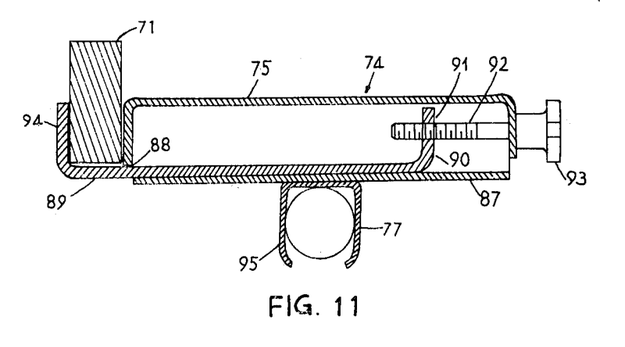
FIG. 11 is an enlarged sectional view of the outrigger taken along line XI—XI of FIG. 9.

A releasable snap-stop device is also provided for locking the work table at commonly used angles of orientation at 15 degree intervals from 0 to 180 degrees. The snap-stop device comprises a pin 63 resiliently and slidably disposed in a housing 64 which is mounted to the plate 53. The pin 63 resiliently extends through the opening at the top of the housing 64 to engage with a plurality of depressions 65 formed in the underside of the annular plate 48. The depressions 65 are evenly spaced 15 degrees apart from 0 to 180 degrees along a semi-circular arc. Thus, when the work table 44 is rotated every 15 degrees from 0 to 180 degrees, the pin 63 will engage with a depression 65 to lock the work table 44 at such orientations. The pin 63 is connected to a pull cable 66 which is operable by a pull knob 67 mounted on the front C-section 12 beside the knob 58 for the gripping block 55. The pin 63 may be disengaged from the associated depression 65 by pulling the cable 66 such that the work table 44 may be rotated to any selected orientation without being locked by the snap-stop device.

Two lateral grooves 68 and 69 are provided respectively at the rear edge and left edge of the work table for mounting fences 70 and 71 therein. Each groove 68 or 69 is formed by an elongated L-shaped member 72 secured along the respective edge. The L-shaped member 72 has a horizontal portion and a short upstanding portion. The horizontal portion is secured to the underside of the lower panel 46 of the work table and it has a thickness equal to that of the annular plate 48 such that it also serves as a spacer to enable the work table 44 to rest stably on the rear C-section 13 of the frame body 11. At least two set screws 73 are provided on the short upstanding portion of the L-shaped members 72 at both the rear and right edges of the work table for securing the fences 70 and 71 in the respective grooves 68 and 69.

At least one auxilliary extension outrigger 74 is detachably securable to the front C-section 12 and rear C-section 13 in order to provide an extension of the work table 44 to support a relatively long work piece, so that the panel will be safely supported by the work table as well as the outriggers.

Figure 6:
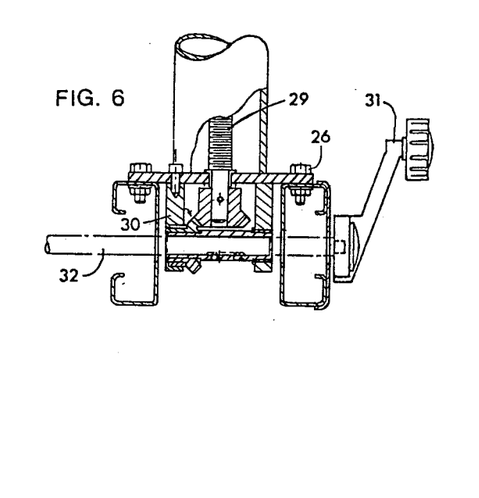
FIG. 6 is an enlarged sectional view of the adjusting means for raising and lowering the traverse beam with respect to the work top of the bench frame.
Figure 7:
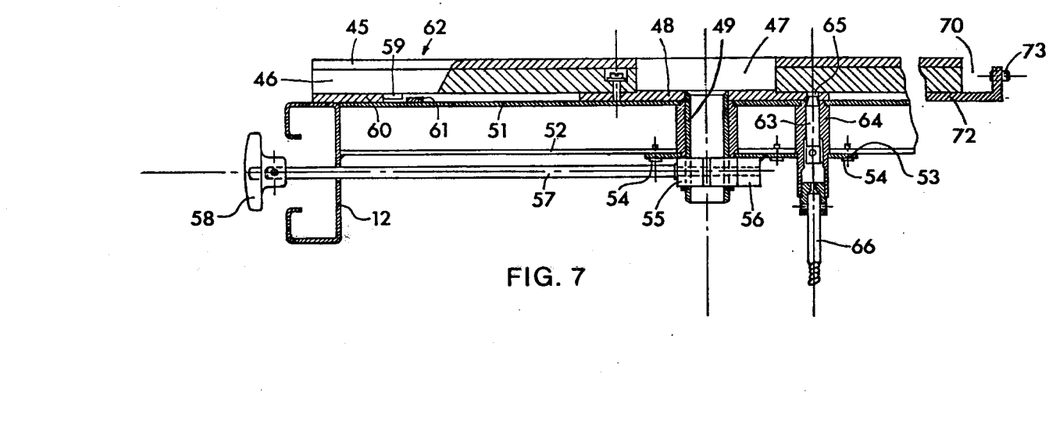
FIG. 7 is an enlarged partial sectional view taken along section line VII—VII of FIG. 3.

The outrigger 74 comprises an elongated rectangular U-section member 75 which may be of a lightweight metal alloy. A leg bracket 76 is mounted near the free end of the U-section member 75 and a leg 77 is pivotally mounted to the leg bracket 76. The leg is pivotable to a substantially vertical position as shown in FIGS. 1, 2 and 6, in which it abuts a vertical abutment plate 78 of the bracket 76 which maintains the leg stably in the vertical position. An adjustable swivel glide 79 is provided at the bottom end of the leg for adjusting the top surface of the outrigger to level with the top surface of the work table 44. An L-shaped member 80 is mounted to the underside of the mounting end of the U-section member 75. The L-shaped member has a horizontal plate 81 welded or otherwise secured to the U-section member 75 and a vertical plate 82 extending downwards perpendicularly from the rear edge of the horizontal plate 81. Two mounting pins 83 are provided on the horizontal plate, such that the pins 83 extend downwards from the horizontal plate 81. A rotatable cam 84 is mounted on the vertical plate 82. The cam 84 is rotatable by turning a star wheel 85.

The outrigger 74 may be detachably mounted to the front or rear C-section 12 or 13 by engaging the pins 83 into retaining depressions 86 (shown in FIG. 3), such that the C-section is held between the horizontal plate 81 and the cam 84. The outrigger is safely secured to the C-section by rotating the star wheel 85 such that the cam urges tightly against the underside of the C-section of the frame body 11. The outrigger can be quickly and easily dismounted from the frame body by turning the star wheel 85 to release the grip of the cam 84 on the C-section and thereafter lifting the U-section member 75 to disengage the pins 83 from the depressions 86.

A horizontal cross plate 87 is mounted transversely under the U-section member 75 and located a short distance from the horizontal plate 82, so that a rectangular opening 88 is formed between the lateral sides of the U-section member and the cross plate 87. A U-shaped clamp member 89 resting on the cross plate 87 and extending through the opening 88 has an inner upstanding end 90 disposed within the U-section member 75. A threaded opening 91 is formed in the inner upstanding end 90, which is engaged with a threaded rod 92 connected to a rotary wheel 93 rotatably mounted on the lateral side of the U-section member 75. The clamp member 89 is slidably movable by turning the rotary wheel 93 such that the outside upstanding end 94 of the clamp member in combination with the lateral side of the outrigger 74 forms a clamp for holding an extension of the fence 71 along the edge of the outrigger.

A resilient bifurcated member 95 can be mounted to the underside of the cross plate 87. The bifurcated member 95 is usable for holding the leg 77 of the outrigger 74 when the leg is in the folded state for storage.

The frame body 11 according to the present invention preferably has a dimension of about 2 feet by 7 feet, such that the bench frame with the legs folded may be conveniently carried in a standard size stationwagon. Thus, the bench frame can be easily transported to any job site. The transportability feature of the present bench frame is particularly advantageous for a small professional woodworker who must be able to carry the bench frame to the job site in order to save the time of having to carry the work piece back and forth from the job site to the workshop if the equipment were not transportable.

The work table 44 is typically of a size about 2 feet by 4 feet. A work table of such size may be mounted on the above mentioned 2 feet by 7 feet bench frame together with a variety of basic woodworking tools. As generally shown in FIG. 2, the work table 44 may be mounted on the right portion of the frame body close to the columns 20, and the saw assembly 43 is also slidably mounted on the right portion of the traverse beam 37. A tailstock 96 and a headstock 97 of a lathe may be slidably mounted between the circular saw assembly 43 on the other column 21, with the headstock powered by a motor 98 mounted under the frame body. A band saw 99 may be detachably mounted on the left side of the front C-section member 12 close to the left column 21. The band saw may be driven by a motor 100 mounted to the attachment bracket of the band saw. The band saw also may have a work table 101 mounted to the front C-section member 12. With such arrangement, each tool may be readily accessible for use without having to exchange tools by dismounting and re-mounting different tools, as in known bench frames. Furthermore, each tool may be operated without interfering with the other tools or having to remove the other tools mounted on the bench frame.

For performing straight sawing operations with the circular saw, the lathe stocks may be slidably positioned to the left such that the circular saw is slidable over the entire length of the work table. Both the circular saw and the work table may be rotated to facilitate mitre, bevel or compound cuts.

In cutting a relatively large work piece, a selected number of outriggers can be mounted to the frame body to support the work piece which can be positioned perpendicular to the bench frame such that it extends through the space between the columns 20 and 21. The spaces between the outriggers permit the user to stand or move close to the bench frame to control operations safely on the work piece. Furthermore, the outriggers may be used as a base upon which to anchor a guide track for a locking pivot point which can be used in operations such as circle cutting, circle sanding, circle routing and circle shaping, all of which operations require a variable radius pivot point.

The motorized part of the circular saw also permits operations such as disc sanding, drum sanding, routing and shaping to be carried out. The present bench frame facilitates such operations by providing a considerably larger and more flexible work surface than that afforded by known power tool benches, together with greater facilities for the attachment of safety and accuracy devices.

The bench frame also permits work table 101 of the band saw to be of much larger size than provided with conventional industrial band saw, such that the work piece may be safely and efficiently handled by the band saw.

The headstock 97 and the tailstock 96 provide an inverted lathe on the bench frame, so that an elongated chisel tool rest running the full length of the frame body may be used, together with a template affixed to the tool rest. The inverted lathe also may be used for mounting a sanding cylinder for surface sanding.

The tailstock 96 is provided also with a pivotable mounting opening 102 for mounting a drill press therein. The adjustable telescopic columns and traverse beam provide a larger throat capacity for drilling relatively larger work pieces than conventional drill presses, which normally have a throat capacity of only a few inches. Also, a series of drills may be mounted on the traverse beam 37 for gang drilling operations. The drill bits can be fed into the work piece simultaneously by simply lowering the traverse beam.

Figure 12:
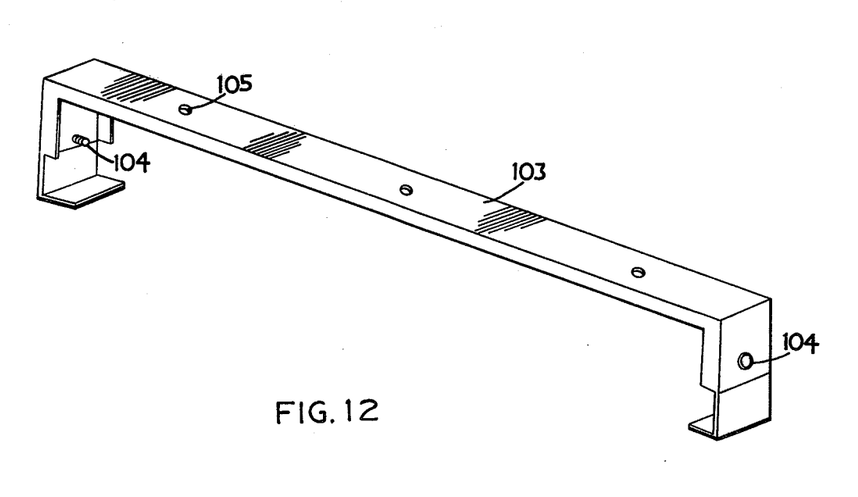
FIG. 12 is a perspective view of the elongated tool rest.

Moreover, since the headstock of the lathe is mounted in an inverted manner, it can be readily reversed for face-plate turning with template. The elongated tool rest 103 as shown in FIG. 12 may be secured on the front C-section 12 by tightening mounting screws 104 against the end sections 14 and 15. The tool rest 103 has openings 105 adapted for attachment of templates for lathe turning operations.

While the invention has been particularly shown and described with reference to a preferred embodiment thereof, it will be understood by those skilled in the art that various changes in form and detail may be made therein without departing from the spirit and scope of the invention.

What I claim as my invention is:

1. A bench frame suitable for precision woodworking comprising a bench having a substantially large rectangular frame body, two pairs of foldable support members provided at two ends of said frame body and operative to support said frame body in a horizontal manner, two spaced telescopic columns provided at two corners of one longitudinal edge portion of said frame body, said columns having two cantilever members provided thereon extending forwardly in a spaced manner above said frame body, an elongated traverse beam mounted to said cantilever members, said traverse beam being operative to receive selected tools to be slidably mounted thereon, and said columns being adjustable simultaneously for selectively raising or lowering said traverse beam with respect to said frame body.

2. A bench frame according to claim 1, including a rotatable work table mounted on said frame body in a spaced manner below said traverse beam.

3. A bench frame according to claim 2, wherein said work table has a shaft member mounted under its centre, said shaft member being rotatably mounted to a bearing member which is fixedly mounted on a cross brace member in said frame body whereby said work table is rotatable with respect to said frame body.

4. A bench frame according to claim 3, wherein said shaft member is tubular and said work table has an opening formed in its centre, said opening and said tubular shaft member forming a chute for waste material on said work table to fall therethrough.

5. A bench frame according to claim 4, wherein said shaft member engages in a gripping means mounted on said cross brace member, said gripping means comprising a split collar surrounding said shaft member, a threaded nut being provided in said split collar, said threaded nut threadingly engaged with a threaded rod whereby said gripping means is selectively operative by rotating said threaded rod to clamp said split collar tightly on said shaft member so as to retain said work table in any selected orientation with respect to said frame body.

6. A bench frame according to claim 5, including a releasable locking means for retaining said work table at selected intervals of orientation with respect to said frame body, said locking means comprising a pin element movably mounted in a housing which is secured to said frame body, said pin element operatively extensible from said housing to engage normally with a plurality of depressions formed in the underside of said work table so as to lock said work table releasably at said intervals of orientation, a cable connected to said pin element and being operative to disengage said pin element from said depressions whereby said work table is rotatable with respect to said frame body.

7. A bench frame according to claim 3, wherein said work table has at least one groove formed along one longitudinal edge or one transverse edge therein adapted to receive a fence member to be mounted therein.

8. A bench frame according to claim 7, including at least one extension means detachably mounted normally to said frame body to provide an extended surface to said work table.

9. A bench frame according to claim 8, wherein said extension means comprises an elongated rectangular U-section member made of lightweight metal alloy, a foldable leg pivotally mounted immediate one end therein and an L-shaped member mounted to the other end, said L-shaped member having a horizontal portion mounted to the underside end portion of said other end, two mounting pins mounted on said horizontal portion and adapted to engage with locating openings formed in the longitudinal C-sections of said frame body, a cam member rotatably mounted on a vertical portion of said L-shaped member, said cam member being rotatable to abut the underside of said C-section when said extension means is mounted thereto whereby said cam member coacts with said horizontal portion and said mounting pins to clamp said extension means securely and detachably onto said frame body.

10. A bench frame according to claim 9, wherein said extension means has a clamp means in one lateral edge therein adapted to receive a fence member to be mounted therein.

11. A bench frame according to claim 10, including a resilient bifurcated means mounted in the underside of said U-section member adapted to retain said foldable leg in a folded condition.

12. A bench frame suitable for precision woodworking comprising a bench having a rectangular frame body of a dimension of about 2 feet by 7 feet, said frame body having two spaced parallel longitudinal C-sections and two spaced parallel transverse side C-sections, two pairs of foldable legs pivotally mounted to four corners of said frame body and being operative to dispose in a substantially vertical manner to support said frame body in a horizontal manner, two spaced vertical telescopic columns provided at two corners of a longitudinal rear edge of said frame body, each of said columns having an elongated inner tubular member fixedly mounted to said frame body through a base plate and an elongated outer tubular member slidably mounted over said inner tubular member, adjusting means connecting to said inner and outer tubular members and operative to move said outer tubular member slidably vertical with respect to said inner tubular member, girder means mounted on said outer tubular members, said girder means having cantilever portions extending forwardly in a spaced manner above said frame body, an elongated traverse beam having a length at least equal to that of said frame body and mounted to said cantilever portions of said girder means, said traverse beam having two runner rods secured to its lower longitudinal edge portions adapted to receive a selected power tool to be slidably mounted thereon.

13. A bench frame according to claim 12, wherein said adjusting means includes a slider tube secured to said outer tubular member, and having a threaded portion therein threadingly engaged with a vertical worm shaft rotatably mounted on said base plate and extending vertically within said inner tubular member, said worm shaft being rotatably coupled to a turn handle mounted on said side C-section of said frame body whereby said outer tubular member is slidably movable with respect to said inner tubular member by turning said turn handle.

14. A bench frame according to claim 13, wherein two turn handles are provided on said frame body with one handle mounted on each side C-section, said turn handles being connected by a common linkage rod coupled to the gear means in both telescopic columns whereby both columns are adjustable simultaneously by operating either one of said turn handles.

15. A bench frame according to claim 14, including a circular saw assembly, a headstock and a tailstock of a lathe assembly slidably mounted on said traverse beam.

16. A bench frame according to claim 15, wherein said tailstock of said lathe assembly includes means for a drill press to be mounted thereon.

17. A bench frame according to claim 16, including an elongated tool rest mounted on the front edge of said frame body, said tool rest being adapted for attachment of templates for lathe turning operations.

* * * * *